US008200822B1

(12) United States Patent
Shkedi

(10) Patent No.: US 8,200,822 B1
(45) Date of Patent: *Jun. 12, 2012

(54) MEDIA PROPERTIES SELECTION METHOD AND SYSTEM BASED ON EXPECTED PROFIT FROM PROFILE-BASED AD DELIVERY

(75) Inventor: Roy Shkedi, New York, NY (US)

(73) Assignee: Almondnet, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,320

(22) Filed: Mar. 12, 2012

Related U.S. Application Data

(63) Continuation of application No. 12/823,709, filed on Jun. 25, 2010, which is a continuation of application No. 11/763,286, filed on Jun. 14, 2007, now Pat. No. 7,747,745.

(60) Provisional application No. 60/804,937, filed on Jun. 16, 2006, provisional application No. 60/805,119, filed on Jun. 19, 2006.

(51) Int. Cl.
*G06Q 30/00* (2012.01)
(52) U.S. Cl. ..................... 709/225; 705/14.66
(58) Field of Classification Search ............... 705/10, 705/14, 14.66, 78; 709/224, 225
See application file for complete search history.

(56) References Cited

U.S. PATENT DOCUMENTS

| | | | |
|---|---|---|---|
| 5,710,884 A | 1/1998 | Dedrick | |
| 5,717,923 A | 2/1998 | Dedrick | |
| 5,724,521 A | 3/1998 | Dedrick | |
| 5,752,238 A | 5/1998 | Dedrick | |
| 5,794,210 A | 8/1998 | Goldhaber et al. | |
| 5,855,008 A | 12/1998 | Goldhaber et al. | |
| 5,918,014 A | 6/1999 | Robinson | |
| 5,948,061 A | 9/1999 | Merriman et al. | |
| 6,026,368 A | 2/2000 | Brown et al. | |

(Continued)

FOREIGN PATENT DOCUMENTS

KR 10-2001-0096343 11/2001

(Continued)

OTHER PUBLICATIONS

Engage Technologies, Inc.; Form S-1A; filed with the SEC; pp. 36-50; Jul. 19, 1999.*

(Continued)

*Primary Examiner* — Wing Chan
*Assistant Examiner* — Kostas Katsikis
(74) *Attorney, Agent, or Firm* — Louis J. Hoffman; David S. Alvai

(57) ABSTRACT

An automatic system facilitates selection of media properties on which to display an advertisement, responsive to a profile collected on a first media property, where a behavioral-targeting company calculates expected profit for an ad correlated with the profile and arranges for the visitor to be tagged with a tag readable by the selected media property. The profit can be calculated by deducting, from the revenues that are expected to be generated from an ad delivered based on the collected profile, at least the price of ad space at a media property where the BT company might like to deliver ads to the profiled visitor. When the calculated profit is positive (i.e., not a loss), the BT company arranges for the visitor to be tagged with a tag readable by the selected media property through which the BT company expects to profit.

51 Claims, 3 Drawing Sheets

U.S. PATENT DOCUMENTS

| | | | |
|---|---|---|---|
| 6,055,513 | A | 4/2000 | Katz et al. |
| 6,073,241 | A | 6/2000 | Rosenberg et al. |
| 6,141,010 | A | 10/2000 | Hoyle |
| 6,216,129 | B1 | 4/2001 | Eldering |
| 6,285,987 | B1 | 9/2001 | Roth et al. |
| 6,285,991 | B1 * | 9/2001 | Powar .............................. 705/76 |
| 6,324,519 | B1 * | 11/2001 | Eldering .................... 705/14.66 |
| 6,366,298 | B1 | 4/2002 | Haitsuka et al. |
| 6,377,986 | B1 * | 4/2002 | Philyaw et al. ................ 709/219 |
| 6,385,592 | B1 | 5/2002 | Angles et al. |
| 6,484,492 | B2 | 11/2002 | Meholic et al. |
| 6,487,538 | B1 | 11/2002 | Gupta et al. |
| 6,615,247 | B1 | 9/2003 | Murphy |
| 6,832,207 | B1 | 12/2004 | Shkedi |
| 6,868,392 | B1 * | 3/2005 | Ogasawara ................... 705/7.25 |
| 6,925,440 | B1 | 8/2005 | Shkedi |
| 6,973,436 | B1 | 12/2005 | Shkedi |
| 6,983,379 | B1 | 1/2006 | Spalink et al. |
| 7,039,594 | B1 | 5/2006 | Gersting |
| 7,043,531 | B1 | 5/2006 | Seibel et al. |
| 7,058,593 | B1 | 6/2006 | Merritt |
| 7,065,550 | B2 | 6/2006 | Raghunandan |
| 7,072,853 | B2 | 7/2006 | Shkedi |
| 7,155,508 | B2 | 12/2006 | Sankuratripati et al. |
| 7,181,438 | B1 | 2/2007 | Szabo |
| 7,188,076 | B2 | 3/2007 | Bensemana |
| 7,194,424 | B2 | 3/2007 | Greer et al. |
| 7,428,493 | B2 | 9/2008 | Shkedi |
| 7,454,364 | B2 | 11/2008 | Shkedi |
| 7,558,795 | B2 | 7/2009 | Malik et al. |
| 7,756,744 | B2 | 7/2010 | Schiff et al. |
| 7,822,637 | B2 | 10/2010 | Shkedi |
| 7,822,639 | B2 | 10/2010 | Shkedi |
| 7,861,260 | B2 | 12/2010 | Shkedi |
| 7,890,609 | B2 | 2/2011 | Shkedi |
| 7,979,307 | B2 | 7/2011 | Shkedi |
| 8,051,444 | B2 | 11/2011 | Shkedi |
| 2001/0020242 | A1 | 9/2001 | Gupta et al. |
| 2001/0039515 | A1 | 11/2001 | Mayadas |
| 2001/0044743 | A1 | 11/2001 | McKinley et al. |
| 2002/0002541 | A1 | 1/2002 | Williams |
| 2002/0072965 | A1 | 6/2002 | Merriman et al. |
| 2002/0072971 | A1 | 6/2002 | DeBusk et al. |
| 2002/0082910 | A1 | 6/2002 | Kontogouris |
| 2002/0082923 | A1 | 6/2002 | Merriman et al. |
| 2002/0091568 | A1 | 7/2002 | Kraft et al. |
| 2002/0099603 | A1 | 7/2002 | Bandura |
| 2002/0112013 | A1 | 8/2002 | Walsh |
| 2002/0123928 | A1 | 9/2002 | Eldering et al. |
| 2002/0133399 | A1 | 9/2002 | Main |
| 2002/0143632 | A1 | 10/2002 | Walter et al. |
| 2002/0161636 | A1 | 10/2002 | Takahashi et al. |
| 2002/0194058 | A1 | 12/2002 | Eldering |
| 2003/0028451 | A1 | 2/2003 | Ananian |
| 2003/0036944 | A1 | 2/2003 | Lesandrini et al. |
| 2003/0046156 | A1 | 3/2003 | Cromer et al. |
| 2003/0050827 | A1 | 3/2003 | Hennessey |
| 2003/0065558 | A1 | 4/2003 | Shaw et al. |
| 2003/0083931 | A1 | 5/2003 | Lang |
| 2003/0083938 | A1 | 5/2003 | Smith et al. |
| 2003/0110497 | A1 | 6/2003 | Yassin et al. |
| 2003/0135413 | A1 | 7/2003 | Nishi et al. |
| 2003/0135853 | A1 | 7/2003 | Goldman et al. |
| 2003/0149938 | A1 | 8/2003 | McElfresh et al. |
| 2003/0154126 | A1 | 8/2003 | Gehlot et al. |
| 2003/0171990 | A1 | 9/2003 | Rao et al. |
| 2003/0208404 | A1 | 11/2003 | Michie |
| 2003/0220837 | A1 * | 11/2003 | Asayama ........................ 705/14 |
| 2004/0024632 | A1 | 2/2004 | Perry |
| 2004/0059632 | A1 | 3/2004 | Kang et al. |
| 2004/0068436 | A1 * | 4/2004 | Boubek et al. ................... 705/14 |
| 2004/0117322 | A1 | 6/2004 | Bjorksten et al. |
| 2004/0260605 | A1 | 12/2004 | McIntyre et al. |
| 2005/0010472 | A1 | 1/2005 | Quatse et al. |
| 2005/0021397 | A1 | 1/2005 | Cui et al. |
| 2005/0028188 | A1 | 2/2005 | Latona et al. |
| 2005/0038698 | A1 | 2/2005 | Lukose et al. |
| 2005/0038702 | A1 | 2/2005 | Merriman et al. |
| 2005/0080772 | A1 | 4/2005 | Bem |
| 2005/0086112 | A1 | 4/2005 | Shkedi |
| 2005/0120091 | A1 | 6/2005 | Casais |
| 2005/0131762 | A1 | 6/2005 | Bharat et al. |
| 2005/0165644 | A1 | 7/2005 | Beyda et al. |
| 2005/0216336 | A1 | 9/2005 | Roberts et al. |
| 2005/0216823 | A1 | 9/2005 | Petersen et al. |
| 2005/0222905 | A1 | 10/2005 | Wills |
| 2005/0278443 | A1 | 12/2005 | Winner et al. |
| 2006/0020508 | A1 | 1/2006 | Gorti et al. |
| 2006/0020510 | A1 * | 1/2006 | Vest ................................ 705/14 |
| 2006/0053047 | A1 | 3/2006 | Garcia et al. |
| 2006/0064351 | A1 | 3/2006 | Hamor et al. |
| 2006/0069614 | A1 | 3/2006 | Agarwal et al. |
| 2006/0095322 | A1 | 5/2006 | Dierks |
| 2006/0106710 | A1 | 5/2006 | Meek et al. |
| 2006/0116924 | A1 | 6/2006 | Angles et al. |
| 2006/0122879 | A1 * | 6/2006 | O'Kelley ........................ 705/14 |
| 2006/0161553 | A1 | 7/2006 | Woo |
| 2006/0183467 | A1 * | 8/2006 | Stewart ...................... 455/414.3 |
| 2007/0121843 | A1 * | 5/2007 | Atazky et al. ............ 379/114.13 |
| 2007/0198385 | A1 * | 8/2007 | McGill et al. ................ 705/36 R |
| 2007/0203794 | A1 | 8/2007 | Hajdukiewicz et al. |
| 2007/0294401 | A1 | 12/2007 | Shkedi |
| 2009/0049468 | A1 | 2/2009 | Shkedi |
| 2009/0172723 | A1 | 7/2009 | Shkedi et al. |
| 2009/0172728 | A1 | 7/2009 | Shkedi et al. |
| 2009/0299843 | A1 | 12/2009 | Shkedi |
| 2010/0325659 | A1 | 12/2010 | Shkedi |
| 2011/0035256 | A1 | 2/2011 | Shkedi et al. |
| 2011/0040607 | A1 | 2/2011 | Shkedi |
| 2011/0040620 | A1 | 2/2011 | Shkedi |
| 2011/0099576 | A1 | 4/2011 | Shkedi et al. |
| 2011/0131294 | A1 | 6/2011 | Shkedi |
| 2011/0225051 | A1 | 9/2011 | Shkedi |
| 2011/0246309 | A1 | 10/2011 | Shkedi |
| 2011/0246347 | A1 | 10/2011 | Shkedi |
| 2011/0252441 | A1 | 10/2011 | Shkedi |
| 2011/0258051 | A1 | 10/2011 | Shkedi |
| 2012/0017240 | A1 | 1/2012 | Shkedi |
| 2012/0047530 | A1 | 2/2012 | Shkedi |

FOREIGN PATENT DOCUMENTS

| | | | |
|---|---|---|---|
| KR | 10-2004-0099222 | * | 11/2004 |
| WO | WO 2004084109 A1 | * | 9/2004 |
| WO | WO 2005046237 A1 | * | 5/2005 |

OTHER PUBLICATIONS

"The e-Marketing Report"; Morgan Stanley Dean Witter; May 2000; portions.*

"ClickOver, Inc. introduces ClickWise, the first inteligent, high-performance ad management system for electronic advertising", Business Wire;Mar. 24, 1997.

* cited by examiner

MEDIA PROPERTIES SELECTION METHOD AND SYSTEM BASED ON EXPECTED PROFIT FROM PROFILE-BASED AD DELIVERY

CROSS REFERENCE TO RELATED APPLICATIONS

This application is a continuation of application Ser. No. 12/823,709, filed Jun. 25, 2010, which is a continuation of application Ser. No. 11/763,286, filed Jun. 14, 2007, now U.S. Pat. No. 7,747,745, which claims the benefit of provisional application Ser. No. 60/804,937, filed Jun. 16, 2006, and provisional application Ser. No. 60/805,119, filed Jun. 19, 2006, which are herein incorporated by reference.

FIELD OF THE INVENTION

The present invention generally relates to profile-based behavioral targeting advertisement placement methods. More specifically, the present invention relates to electronic advertisement placement based on expected profit from the placement.

BACKGROUND OF THE INVENTION

DoubleClick's "Boomerang" is a service for advertisers that places a cookie on computers of visitors to an advertiser's site for the purpose of finding those visitors on other sites where DoubleClick is the ad server ("ad" is short for advertisement). When the same visitors are found on those other sites, additional advertiser's ads are served to them by the DoubleClick ad sever or by the advertiser's ad server following a redirect from the DoubleClick ad server.

The only server that can read a cookie on a user's computer is a server operating under the same domain as the server that placed the cookie on a user's computer to begin with. In other words, a cookie placed by a server operating under one domain cannot be read by another server working under a separate domain. That is why the advertiser cannot expect to place a cookie of its own (e.g., ford.com cookie) on a visitor to its site and then later expect the DoubleClick ad server (doubleclick.com) to be able to recognize the visitor when that visitor is visiting sites where DoubleClick serves ads by reading the ford.com cookies. Only a server operating under the DoubleClick domain can read a cookie placed by a server operating under the DoubleClick domain. So, DoubleClick needs to place a doubleclick.com cookie on visitors to the ford.com site for DoubleClick to later find those visitors within other sites, i.e., where the DoubleClick ad server is used to serve ads.

For a site to have its ad served by an ASP-hosted ad server, such as the one operated by DoubleClick, the site needs to redirect visitors from the site to the DoubleClick ad server, to fetch the ad from the server. Following the redirect from the site, the visitor accesses the DoubleClick ad server. Because the DoubleClick server is operating under the DoubleClick domain, it can read the DoubleClick cookie or cookies and then recognize that it encountered the same visitor in the past. In this example, the DoubleClick ad server recognizes the visitor as someone who visited the ford.com site.

AlmondNet, Tacoda, RevenueScience, and other companies (herein "BT companies"; "BT" stands for behavioral targeting) specialize in targeting ads based on observed behavior of sites' visitors. BT companies place a cookie (or cookies) on the computers of visitors to specific sections of a publisher's website or on the computers of visitors of the publisher who conducted a specific action such as search, click content, click an ad, request information, acquire a product, etc.

The placement of cookies allows those publishers or the BT company itself to sell ads to advertisers. Those ads will be presented to the visitors when they are found later on the same site or on other sites. Such sites can be either a site where the BT company's software is used or a site where the BT company has bought media. The BT company may buy the media on behalf of itself or on behalf of the publisher, who is interested in delivering ads to its audience outside the publisher's site.

Although a BT company (AlmondNet, Tacoda, RevenueScience, etc.) acts as an agent that places cookies on the computers of publisher's visitors for the purpose of delivering targeted ads to the publisher's visitors on other sites, the publisher can work without an agent and place cookies or tags on the computers of the publisher's own visitors for the purpose of delivering ads to those visitors on other sites where the publisher buys ad space. Such a publisher, acting without an agent, is also included in the definition of a BT company.

A publisher may also be referred to as a "profile supplier" when it transfers profile information, such as behavioral information, demographic information, etc., to a BT company. Therefore, a publisher that is a BT company may also be its own profile supplier. Furthermore, although the name "BT company" implies the targeting of ads is based on collected behavioral profiles, a BT company may also collect other kinds of profile information, such as demographic information or user-provided information, and target ads to those visitors wherever found based on the collected profile information.

Another kind of a BT company is a company that has software installed on a person's computer, such as toolbar software, desktop search software, weather software, or any kind of software that is used by the computer's user. Such software also monitors the computer user's visits to different publishers' sites and media properties and collects profile information about the computer user for the purpose of delivering ads to the user within ad space of sites and media properties that the user visits based on the collected profiles.

A BT company using software installed on a user's computer does not need the cooperation of a visited media property to collect information about the visitor's visit because that software monitors whatever the user is doing on his or her computer. A BT company that has software installed on a user's computer is therefore its own profile supplier. Such software can place a cookie or another kind of tag on the user's computer. Because the software is installed on the user's computer, it can write cookies readable by any domain. That means that the BT company can place a tag or cookie of a second media property, if the BT company would like the second media property to recognize the visitor when the visitor visits that second media property site, by simply having the software place a cookie operating under the domain of the second property on the visitor's computer. The software may also report the collected profiles to a central server of the BT company.

The central server may also tag the visitor or arrange for the visitor to be tagged by operators of other media properties. A BT company can place a cookie on a site's section when a visitor's computer visits that section, if a code of the company was integrated into the page of that section by the site that owns the page. The code (e.g., HTML or Java) redirects to the BT company's server all visitors to the page. Also, in the case that the BT company is the publisher itself, the publisher will simply "cookie" (by itself) all visitors that either read a specific content, search, click, ask for information, make a phone call, etc.

The BT company's server, which either gave the site a unique code for a page, received from the page its URL, or received access to the page's content that could be analyzed by the BT company's server, etc., identifies the content read by the page's visitor or the keyword searched for by the user, or an ad clicked on the page, etc. The content read by the page visitor could be identified by the BT company's server whether the content was reported by the site or whether the content was identified following the analysis of the page. The server then places a cookie on the user's computer indicating what content was read by the visitor on the page, what keyword was searched for by the user, or what ad was clicked on the page, etc. The placed cookie indicates that information (1) in the cookie per se, (2) in a central database operated by the server where the cookie ID is used as a record finder, or (3) both in the cookie and in the database.

Although the above description relates to cookies, a cookie is only one example of a possible tag. A tag generally is a unique identifier used to mark a person electronically visiting a media property, such as a web site, TV channel, radio show, or the like, using a computer, a mobile device, a TV set, a TV set top box, or any other device.

The tag is used for the purpose of delivering additional ads to a visitor to one media property when that visitor is found later on other media properties, based on the visitor's profile collected on the first media property. The profile could be the observed behavior of the visitor on the media property, demographic information collected on the media property, profile information provided by the visitor to the media property, etc.

Because the purpose of the tag is to enable the delivery of additional ads on other media properties visited by the visitor, and because the delivery of an ad requires only control of the ad space and not necessarily control of the entire media property visited by the visitor, a media property (in the present context) can also be defined as any equipment that controls an ad space viewed by a visitor, including a web site, an ad network's site (where the ad network represents the ad space of different sites), a TV program, some of the ad space within TV programs or TV channels (represented by a cable company), a TV network, or any ad space for which an entity is allowed to sell an advertisement and deliver it within the ad space; whether the ad space is owned by that entity, or whether the entity pays the owner of the ad space when using its ad space to deliver an ad sold by the entity. Ad space can be on a web site, in a TV program, in a text message, in a radio show, in any broadcasted material, in any streaming video or audio, etc. An ad space can be a fixed position on a page, or the ad space can be made available by a web site to an ad network (for example) only when the web site did not sell all of the site's ad inventory and therefore wishes to make some of the inventory available to the ad network.

In the case of a media property controlling an ad space viewed by a visitor, a specific ad space on a page might be controlled only temporarily. For example, in the case of the web site that did not sell all the ad impressions available to be delivered within an ad space on a page and therefore makes the unsold ad space available to the ad network to fill, the ad network will have temporary control of the ad space, i.e., when that ad space is given to it by the web site. Once the site redirects the ad space on the page to the ad network (so the ad network could fill the ad space with an ad sold by the ad network), the ad network controls the ad space and has access to the visitor viewing the ad space that was redirected to the ad network by the site, and therefore the ad network's equipment is considered a media property, as it controls an ad space viewed by a visitor.

The tag can be placed on the device used by the user to access the first media property where the user's profile was collected (in case of observed behavior, that behavior can be reading a specific content, searching, clicking an ad or content, making a phone call, asking for product information, acquiring a product, or taking any other kind of action). A tag placed on the device (1) could be read only by a server operating under the same domain as the server that placed the tag on the device to begin with as in the case of a cookie for example, (2) could be placed on the device when the user visited the first media property, and then the tag can be read by any second media property visited by the visitor, or (3) could be encrypted and, while accessed by any second media property visited by the visitor, the tag could be deciphered only by second media property computers that received the deciphering code from the first media property. In case of a tag placed by software installed on a user's computer, the tag could be whatever the software wants it to be, including a cookie of any domain.

A tag does not have to be placed on the user's device. A tag can also be used in a central database of a BT company or a central database of any second media property visited by the visitor, where the tag could be a unique identifier either of the device or of the user. In the case where the tag identifies the device, the tag might denote an IP address, a phone number, a device's manufacturer serial number, etc. A cookie placed on the device can also uniquely identify the device and the cookie therefore can be used as a tag in a central database. In the case where the tag identifies the user, the tag might denote the username and password used to access a media property, a user's name and address, a user's e-mail, a user's social security number, or any other personal identifiable information.

As already mentioned, the observed behavior of a visitor to a first media property is referred to as profile information about a specific visitor. A visitor's profile might be enhanced by the visitors' observed behavior on other media properties or by other profile information collected on other media properties.

A visitor's profile can be represented by a unique tag, or the profile can be stored with the tag, whether the tag is placed on the device, on a central database, or both. For example, the profile can be stored within a cookie (tag) on a visitor's device, or the profile can be stored in a central database where the tag connected to the profile is used as a unique identifier of the visitor's device or of the visitor personally. The profile can also be saved on both the device and a central database.

One of the major challenges in targeting a first site visitor on another site with an ad based on his observed behavior on sites visited by him previously (such as the first site) is actually finding the visitor on other sites.

Depending on the tag placed (or arranged to be placed) by the BT companies, the visitor could be recognized either by the entity that placed the tag to begin with (which requires access by that entity to the tag when the visitor visits a second media property) or by the second media property reading the tag (in which case the tag can be placed by the second media property if the BT company so arranges).

BT companies, acting as an agent, can find visitors tagged by them, when the tagged visitors are present on sites that use the BT companies' software (either to serve ads or in conjunction with those sites' ad servers). BT companies (whether it is acting as an agent, is the publisher itself, or is operating with any other BT company) can find visitors tagged by them, when the visitors are present on sites and ad networks where the BT companies buy media.

To make the process of finding people who visited a first media property on other media properties more efficient, BT companies enable sites and ad networks (from whom the BT companies buy media) to also place their cookies on the computers of people (visitors) on whose computers the BT company has placed its own cookie. That technique is similar to the way DoubleClick's Boomerang system places cookies on visitors to an advertiser site for the purpose of finding those visitors later on other sites where Doubleclick serves ads.

An ad network ad server (or any other server of the ad network) or a site's ad server (or any other server of the site) can place their own cookies on the computers of visitors that are redirected to them by the BT companies, for the purpose of later recognizing those visitors within their own ad space (i.e., the ad space of the ad networks or the sites).

This process—where sites and ad networks place cookies on visitors' computers redirected to them by BT companies (or other entities interested in additional ads presented to their audience elsewhere)—is sometimes referred to as "cookie matching."

For example, weather.com might place a weather.com cookie on a user's computer marking him or her as a visitor to BT company #1, following a redirect from BT company #1 server. Later, if and when the weather.com ad server recognizes that the same visitor (previously redirected to him by BT company #1) happened to visit weather.com (weather.com will recognize the visitor by reading its own weather.com cookie, which marked the visitor as a BT company #1 visitor), the weather.com ad server can, if it wishes, redirect the visitor's computer to the BT company #1 server, to have an ad served to the visitor, either by BT company #1's ad server or another ad server to which BT company #1 ad server further redirects the visitor. The weather.com ad server's decision, whether or not to redirect the visitor's computer to BT company #1's server can be based on the price that BT company #1 promised to pay weather.com for the presentation of an ad within weather.com's ad space, to a visitor previously redirected to weather.com by BT company #1's server.

Although the above-described processes enable a second media property to recognize a first media property visitor, it is still a very inefficient process for the following reasons:

(1) Media properties' ad space prices vary.

(2) Profiles of media properties' visitors are worth different amounts to advertisers depending on the profiles. For example, a person who searched for a "mortgage" on a search engine might be presented with a mortgage-related ad, for which the advertiser is willing to pay $3 if that person clicks on that ad. A person who searched for "socks" on a search engine might be presented with a socks-related ad, for which the advertiser is willing to pay $0.50 if that person clicks on that ad. A person who visited the mutual fund section of a site might be presented with a mutual-fund related ad (wherever the person is found, i.e., either on the same site or on other sites), in which case the advertiser is willing to pay $25 for every thousand ads (CPM) presented to people who visited that mutual fund section.

(3) The same person might have several profile attributes in his or her profile (as a result, for example, of that person conducting several different searches and visiting different sites). Different advertisers might be willing to pay different amounts for delivering ads to the person based on the specific profile attribute or attributes that the respective advertisers are looking to target.

In summary, the cost of ad space at a second media property might not be covered by revenues generated for a BT company buying the space, i.e., from an ad delivered within the second media property ad space based on a profile collected in a first media property or properties. Alternatively, the revenues might cover the media cost but not deliver satisfactory margins to the BT company, when taking into account other costs, such as ad sales people cost, ad serving cost etc.

SUMMARY OF THE INVENTION

According to various aspects of the invention, therefore, an automatic system is described to facilitate selection of media properties on which to display an advertisement, responsive to a profile collected on a first media property, where a BT company calculates expected profit for an ad correlated with the profile and arranges for the visitor to be tagged with a tag readable by the selected media property.

The profit can be calculated by deducting, from the revenues that are expected to be generated from an ad delivered based on the collected profile, at least the price of ad space at a media property where the BT company might like to deliver ads to the profiled visitor. When the calculated profit is positive (i.e., not a loss), the BT company arranges for the visitor to be tagged with a tag readable by the selected media property through which the BT company expects to profit.

The above summary does not include an exhaustive list of all aspects of the present invention, Indeed, the inventor contemplates that the invention may include all systems and methods that can be practices from all suitable combinations of the various aspects summarized above, as well as those disclosed in the detailed description below and particularly pointed out in the claims filed with the application. Such combinations have particular advantages not specifically recited in the above summary.

DESCRIPTION OF PREFERRED EXEMPLARY EMBODIMENTS

Figure 1:
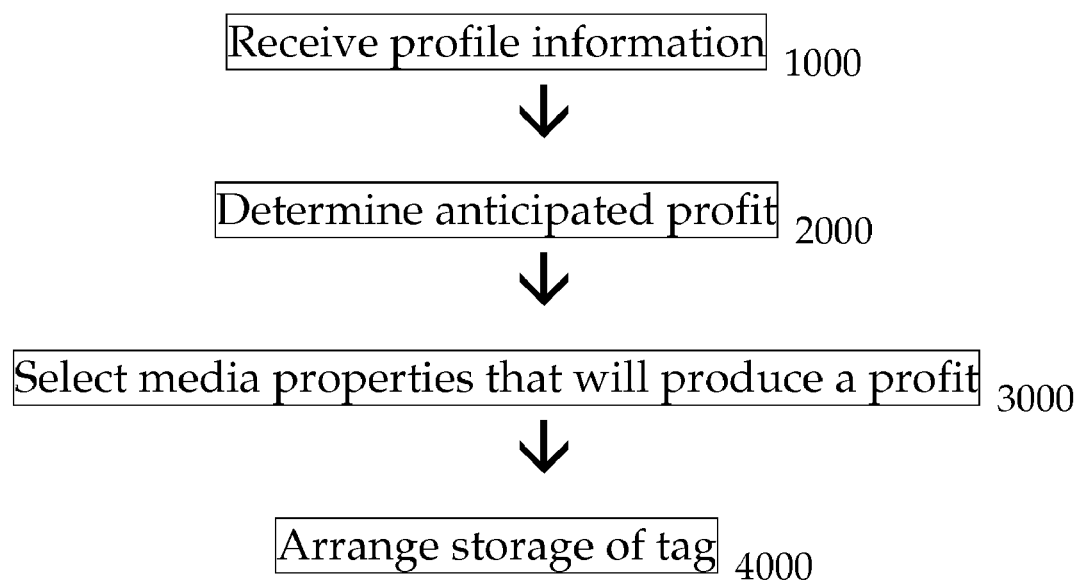
FIG. 1 is a flow diagram of an exemplary embodiment of a profit-based selection method.

Referring to the embodiment of FIG. 1, responsive to receiving (1000) profile information (e.g., actions) of an electronic visitor with respect to a first media property, the instant method includes (i) determining (2000) anticipated revenues and/or profit resulting from placing an advertisement targeted to the visitor based on the received profile, and (ii) automatically selecting (3000) at least one media property for which it is anticipated that there will be a positive profit in delivering an ad to the profiled visitor. The method includes, via an electronic communications media, for each of the selected media properties, arranging (4000) for electronic storage of a tag readable by said media property, wherein the tag is associated with the visitor.

Profit can be defined as:

(1) revenues expected to be generated, from an ad delivered based on the collected profile, minus the ad space cost at a specific media property (i.e., Pr=Rev (profile)–P(mp), where "Pr" is profit, "Rev" is revenue generated from advertising to a visitor with a particular profile, and "P" is the price charged by media property "mp" for advertising in an ad space);

(2) revenues expected to be generated, from an ad delivered based on the collected profile, minus the sum of (a) the price for buying ad space on the specific media property, (b) ad serving cost, (c) ad sales associated cost, and (d) desired profit margin (i.e., Pr=Rev(profile)−P(mp)−C−Mar, where "C" represents costs and "Mar" represents desired profit margin), or (3) in other ways.

If the calculated profit indicates that the BT company will lose (negative profit) from delivering an ad, based on the received profile on any of the possible media properties where it is buying ad space, the BT company won't arrange for the visitor to be tagged by a tag readable by any of those media properties, and the BT company might even decide not to collect the profile (so the visitor's profile will not be stored). Using the equation defining profit in item (2) just above, the question of whether the profit is positive or negative, as stated in this paragraph, equates to testing (4) whether Rev(profile)−P(mp)−C−Mar>0, which is the same as (5) whether Rev(profile)−P(mp)−C>Mar, or (6) whether Rev(profile)>P(mp)+C+Mar, or (7) whether P(mp)<Rev(profile)−C−Mar. Grouping the terms on the right-hand side of the equation in item (7) reduces that equation to the same as testing whether the price charged by a media property is less than a price cap, with the price cap being defined as the difference determined by subtracting from the revenue generated from advertising to a visitor with a particular profile a selected amount, here defined by the costs and desired profit margin.

Likewise, using the equation defining profit in item (1) just above, the question of whether the profit is positive or negative equates to testing (8) whether Rev(profile)−P(mp)>0, which equates to testing (9) whether P(mp)<Rev(profile), which again is the same as testing whether the price charged by a media property is less than a price cap, with the price cap being defined in this instance simply as the available revenue generated from advertising to a visitor with a particular profile.

Figure 2:
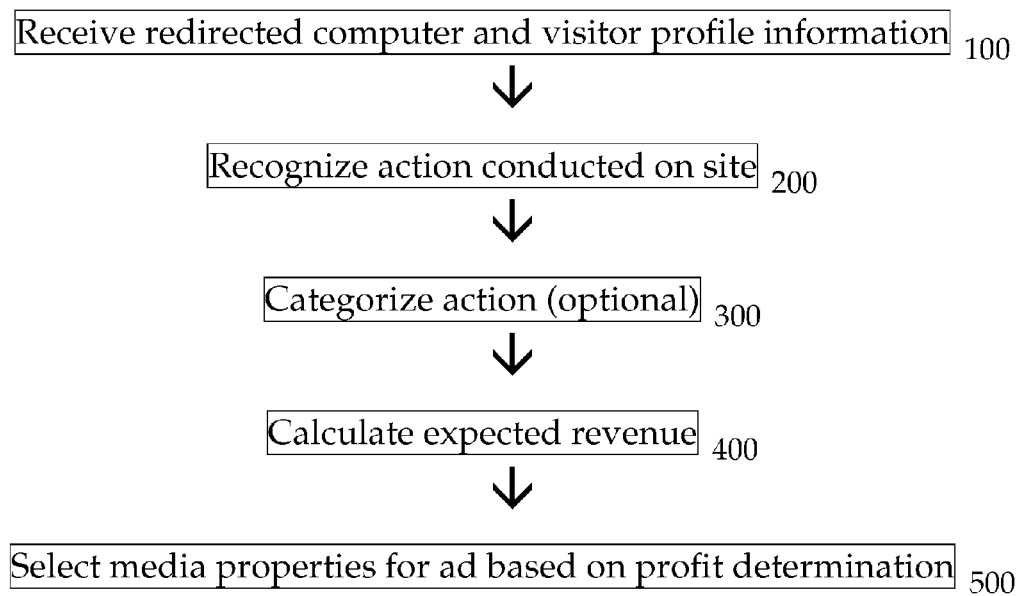
FIG. 2 is a flow diagram of an exemplary embodiment of a profit-based selection method.
Figure 3:
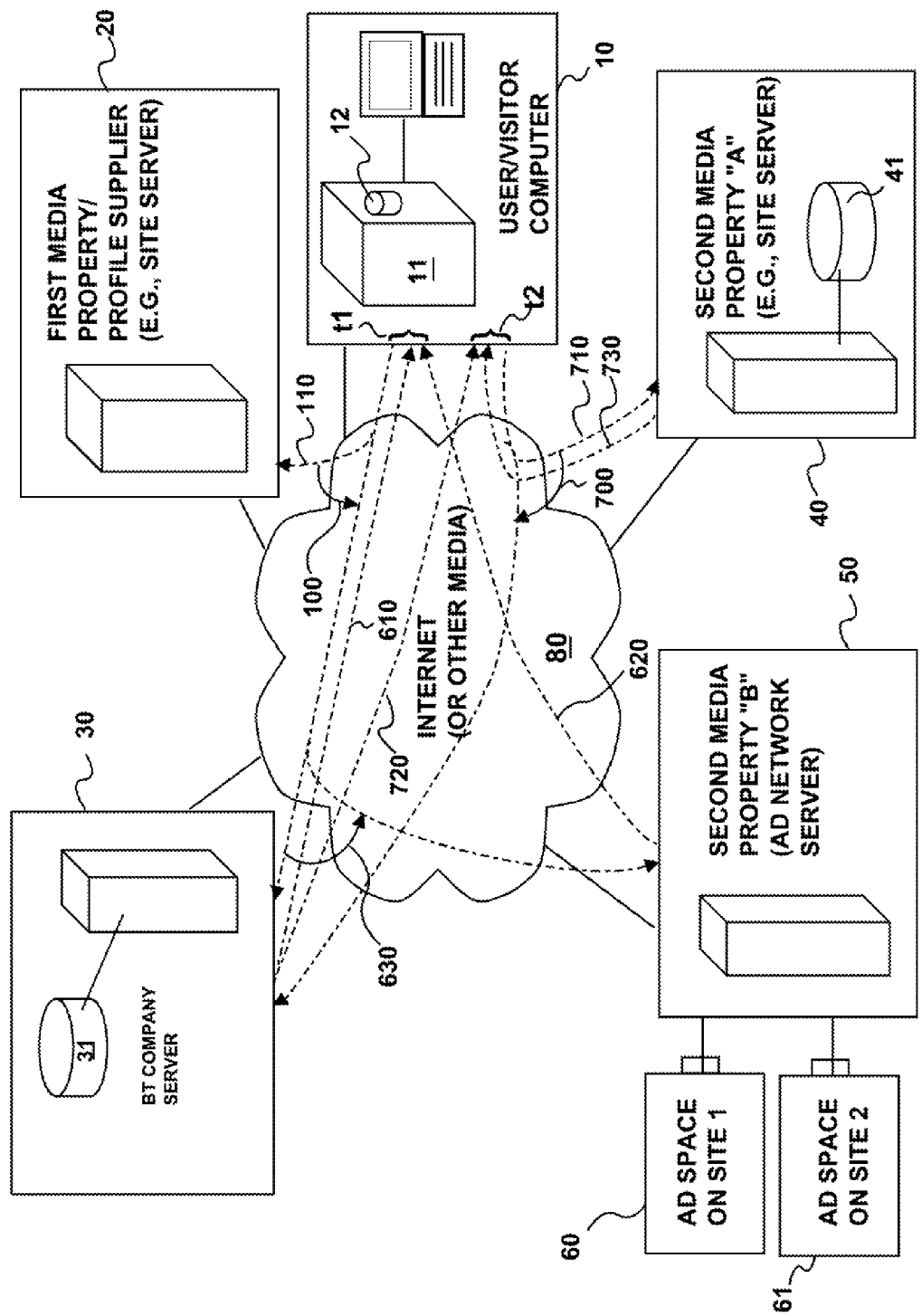
FIG. 3 is a schematic of an exemplary embodiment of entities and associated equipment used with a profit-based selection method.

The method includes the following basic steps, shown in FIGS. 2 and 3:

1. A profile supplier 20 redirects (100) a visitor 10 to a BT company 30 along with the visitor's profile. In case the profile supplier 20 is also the BT company 30, this step either does not take place or takes place internally, for example via an internal redirect from one server to another server operating under the same domain that belongs to the publisher/BT Company. In case the BT company 30 has software on a user's computer 11 that enables it to monitor the user's visits to media properties (e.g., 20, 40, 50) without the cooperation of the media properties, this step either does not take place or takes place internally, e.g., by the software on the user's computer communicating the collected profile to the BT company's central server.

2. The BT company 30 recognizes (200) the content read by the user 10, the category to which the content read by the user 10 belongs, the keyword searched for by the user 10, an ad clicked by the user 10, or any other action conducted on the page/site 20 by the user 10 (such as click on an item of content or an ad, purchase of a product, request for more information, etc) during the site visit (110). The recognizing might be as simple as pulling a keyword for which the visitor 10 searched from a URL used by the profile supplier 20 to redirect the visitor 10 to the BT company 30, for example.

3. The BT company 30 optionally can categorize (300) specific content read by the user 10, or an action conducted by a user 10. An example action might be a search for a keyword. To illustrate, suppose a person searched for an airline ticket to Florida on a travel site. When the BT company 30 receives that information, in addition to recording the search for the flight to Florida in the visitor's profile (whether the profile is stored in the cookie or tag, the BT company's central database 31, or both of those places), the BT company 30 may further categorize the person under the "Travel" category and in the "Search for Flights" subcategory of "Travel."

4. The BT company 30 calculates (400) expected revenues from delivering ads based on the collected profile (Rev(profile) in the equations above). The revenues are calculated based on the kind of collected profile: (a) Expected revenues from content read by the visitor 10 can be calculated by checking, for example, how much advertisers are willing to pay for delivering ads to visitors who read specific content. (b) Expected revenues from delivering ads based on a keyword searched by the visitor 10 can be calculated by checking, for example, how much advertisers are willing to pay for each click on an ad related to the keyword for which the visitor searched and multiplying that price per click by an assumed click-through rate on ads related to the searched-for keyword, up to 14 days after the visitor's search. In general, expected revenues can be calculated for the delivery of ads based on a category of content read by the visitor 10, for specific content read by the visitor 10, or for action taken by the visitor 10 (e.g., made a phone call, clicked an ad, clicked specific content, asked for information, acquired product, etc.).

5. The BT company 30 selects (500) media properties (e.g., 40) for the delivery of an advertisement based on a profile collected on a first media property 20. The BT company 30 makes the selection based on a calculated expected profit and then arranges for the visitor 10 to be tagged (610 or 620) with a tag readable by the selected media property 40. The profit is calculated in any of the alternative manners stated above.

The BT company's arranging placement of the tag can be achieved in different ways:

A. The BT company 30 can redirect (630) a visitor to the selected media property 40, 50 with a request to have the selected media property 40, 50 tag (620) the visitor with the media property's own tag, which obviously is readable by the selected media property 40, 50 (such a tag could be a cookie on the visitor's storage device 12).

B. The BT company 30 can itself place (610) a tag that will be readable by the selected media property 40.

C. The BT company 30 can place an encoded tag that, although accessible by any media property (e.g., 40, 50), can be read only by a selected media property 40 to which the BT company gave a deciphering code.

D. In cases when the BT company 30 has software installed on a user's computer 10, the BT company 30 can arrange for the software to place (not shown) a tag readable by the selected media property 40 (such a tag could be a cookie operating under the selected media property domain).

E. The BT company 30 can arrange for the selected media property 40 to place a tag in the selected media property's central database 41, in which case the tag can uniquely identify (1) the device 11 that the visitor 10 will use to access the selected media (IP address, set-top box ID, mobile phone number, manufacturer serial number, cookie readable by the selected media property, etc.), or (2) the user as a person (personal identifiable information).

When a selected media property 40 recognizes a tagged visitor 10 (tagged previously, at time t1) later (at time t2) visiting (710) its ad space, the media property 40 will arrange for the BT company 30 to serve an ad (720) to the visitor 10

(which will appear with the media content (730) requested by the visitor), by redirecting (700) a visitor to the BT company 30, for example.

The media properties can be of the same kind of media (e.g., two web sites 40, 60 on the Internet 80) or of different media (e.g., first media property can be a web site 40 on the Internet 80, and the second media property can be a TV channel on TV or a text message system on a mobile phone, etc.). In the case (not shown) where the second media property operates within a different media than the first media, the tagging of the visitor with a tag readable by the second media property (which is arranged by the BT company 30) might include finding the device used by the visitor 10 to access the second media by using personal identifiable information about the visitor 10. As there may be no connection between the device used by the visitor to access the first media property (computer 11, for example) and the device used by the visitor to access the second media property (TV, for example) besides the commonality of the user (visitor) 10, personal identifiable information about the visitor 10 could be used to allow the second media property to learn which device the visitor 10 uses to access the second media property and tag the visitor 10. The second media property could tag the device used by the visitor 10 to access the second media property by placing a tag on the device itself or in a central database of the second media property, for example).

Although the BT company 30 stores the visitor's collected profile, in the above-described implementation it does not transfer the collected profile to the second media property 40, 50 but simply asks the second media property 40, 50 to tag the visitor as a BT company visitor or arrange for a tag to be placed (620) that is readable by the second media property 40 and that marks the visitor as a BT company visitor. As the BT company 30 buys ad space from the proprietor of the second media property 40 and delivers therein an ad based on the collected profile, the BT company 30 has no economic incentive to transfer the profile information itself (such as the fact that the visitor searched for "car insurance") to the second media property 40. The second media company's proprietor is being paid for the ad space and therefore just needs to know that the visitor 10 has been profiled by the BT company 30, which will pay the second media property's proprietor for an opportunity to deliver an ad to this visitor 10 within the ad space of the second media property 40.

Suppose, for example, a person searches for "mortgage" on Google (Google is a BT company 30 in this example). Using the method above, Google calculates that advertisers are willing to pay $3 per click on a mortgage-related ad, that the expected click-through on a mortgage-related ad is 0.3%, and therefore Google will earn $9 for every thousand mortgage-related ads delivered to people that searched for "mortgage" on Google when those people are found later, anywhere on the web (i.e., this is "Rev(profile)"). Google further knows that it costs Google $3 CPM to deliver a thousand ads on weather.com (i.e., "P(mp)") to computers that were tagged by weather.com as Google visitors. Google therefore can calculate a profit of $6 CPM (without taking into account other costs, i.e., "C") for delivering a thousand mortgage-related ads to Google visitors who searched for "mortgage" on Google when found later within the ad space of weather.com. Google will therefore arrange for weather.com to tag the person who searched for "mortgage" on Google as a Google visitor (by redirecting the visitor to weather.com with the request to tag the person as a Google visitor, for example).

In the case where a second media property controls ad space with prices that fall within a range, the BT company 30—in addition to arranging for the second media property (e.g., 50) to tag (620) its visitor—may also provide the second media property 50 with the price the BT company 30 is willing to pay the second media property 50 for delivering an ad within the second media property's ad space. In FIG. 3, second media property 50 is shown as an ad network's site (where the ad network represents the ad space of different sites, 60, 61), as described above. The price delivered from the BT company 30 enables the second media property 50 to determine which ad space it should allocate to the BT company 30 when the tagged visitor 10 visits the second media property 50. Although some of the ad space (e.g., on site 60) might be too expensive, i.e., above the cap defined by the price the BT company 30 is willing to pay, other ad space (e.g., on site 61) might have a cost that would be covered by the price the BT company 30 is willing to pay. However, obviously, the BT company 30 will not arrange for tag placement if the price it is willing to pay for delivering an ad to the profiled visitor 10 is less than the lowest price demanded by a second media property 50 for delivering an ad within that ad space, i.e., price cap<min[P(mp)].

Given that some kind of profiles such as behavioral profiles are time-sensitive (in other words, their value diminishes with time), the BT company 30—in addition to arranging the placement of a tag readable by the second media property 40, 50—may also provide the second media property 40, 50 (via the tag, for example) with a time period within which the BT company 30 will agree to deliver ads to the profiled visitor 10 within the ad space of the second media property 40, 50. Suppose, for example, a BT company 30 collected a profile of a visitor 10 who searched for "flowers." The BT company 30 might arrange for the visitor 10 to be tagged with a tag, readable by a second media property 40, marking the visitor 10 as the BT company's visitor and setting a time limit of two days, which means that the second media property 40 can call upon the BT company 30 to serve an ad to the tagged visitor 10 only when the visitor 10 is found within the second media property's ad space up to two days after the visitor 10 was tagged (the tag may have a time stamp identifying the date and time the tag was placed to help the second media property 40 calculate the date before which the second media property 40 can call upon the BT company 30 to serve an ad).

The calculation that takes place in steps 4 and 5 of the above-described method may take place not at the time of profile collection as described above but beforehand. Conducting the calculation before the profile is collected can shorten the time it takes the server 30 to select the media properties. The calculation might be done beforehand for other reasons.

Specifically, step 4 (which states that the BT company 30 calculates the expected revenues from delivering ads based on the collected profile, where the revenues are calculated based on the kind of collected profile, i.e., "Rev(profile)") may take place in advance. If for example, a collected profile describes the content read by a visitor, then, if other profiles were previously collected of the same kind of profile, there is no need to check how much advertisers are willing to pay for delivering ads, as it was already checked for profiles of the same kind.

The word "calculating" expected revenues can encompass a scenario in which there are no arithmetic calculations, but rather simply an act of locating the correct information. In this example, the information concerning how much advertisers are willing to pay for delivering their ads to visitors 10 that read a specific content is located, and no arithmetic calculation is needed.

For another example, if the expected revenues for delivering an ad for someone who searched for "mortgage" has recently been calculated, then there is no need to calculate it again, and the information can simply be located.

Although the examples describe calculation of revenues from delivering an ad at a media property 40, 50, depending on the method of payment for the media property, different calculations of expected revenues can take place.

If the media property only gets paid for when a visitor visiting it takes action, then the revenues per profile-based ad delivery should also be based on an action. Such a visitor action can be a click on an ad, a request for information from the advertiser (following a click on the ad), a registration with the advertiser, an act of buying a product or service from the advertiser, etc.

For example, if the media property 40 is paid at the rate of $0.40 per click on an ad presented to the media property's visitor, the BT company 30 will check how much the advertiser will pay the BT company 30 per visitor click when viewing an ad based on the collected profile. If the price per click paid by the advertiser at least exceeds the price per click paid for the media property, then the BT company 30 can arrange for the tagging of the visitor 10 with a tag readable by the selected media property (the one that will cost $0.40 per click).

In some scenarios, the BT company 30 might be paid for every ad delivered to a visitor, but the media property might trigger payment for every visitor click on an ad. Conversely, the BT company 30 might be paid for a visitor click on an ad, but the media property might trigger payment for every delivered ad regardless of whether a click took place or not. In those scenarios, so as not to expose itself to the risk of loss, the BT company 30 preferably translates the payment it receives (whether per ad delivery or ad click or per action) to the payment method applied to the media property. For example, if the BT company 30 is paid $0.25 per click on an ad by a visitor who searched for a "DVD" but a media property triggers payment for every ad delivery at $0.50 CPM (regardless of whether a click took place), the BT company 30 can translate the payment per click it receives to payment for ad delivery. In this example, the BT company 30 can calculate that, with an expected click-through of 0.4% on DVD-related ads by people who searched for "DVD" up to seven days before they are presented with an ad, the BT company 30 will generate $1 CPM (0.4% CTR*1,000 ads*$0.25 per click=$1), i.e., Rev(profile)≈$1 CPM. Because $1 CPM is more than the $0.50 cost of the media property (i.e., Rev(profile)>P(mp)), the BT company 30 will make a gross profit of $0.50 CPM and therefore (assuming costs are low or ignored) arrange for tag placement.

Likewise with respect to step 5 (which states that the BT company 30 selects media properties for delivery of an advertisement based on a profile collected on a first media property where the selection is made by the BT company 30 based on a calculated expected profit), the calculation on which the media property selection is based could be a calculation done beforehand. If the collected profile is of the same kind as another profile that was collected recently (for example, both profiles describe "searching for flights") then the information concerning how much revenues would be generated from such a profile is already available, and there is no need to recalculate. Also, the profit has also been calculated, because the cost of ad space at the different media properties probably does not change in a short period of time. A look-up table can be used that lists, based on the kind of profile, the media properties that should be selected. In such a scenario, the steps of the method will be:

1. The BT company 30 calculates expected revenues from delivering ads based on different collected profiles.

2. The BT company 30 calculates expected profits (or losses) for the delivery of ads based on different collected profiles within the ad space of different available media properties 40, 50.

3. The BT company 30 builds a table wherein each kind of profile is assigned media properties where ads will be delivered based on the profile, and wherein the selection of media properties is made based on the previously calculated profit. The table is updated on a regular basis to make sure it is up to date.

4. The BT company 30 collects a profile.

5. The BT company 30 arranges for placement of a tag readable by a selected media property, where the selected media properties are taken from the table described in step 3 above.

The above is just one possible implementation. Instead of a table, a database or any other data structure can be used. The calculation could be done entirely in advance, entirely when the profile is collected, or a combination wherein some of the calculation is done in advance and some when the profile is collected.

Accordingly, the method can be described in the following more general steps:

1. The BT company 30 collects a profile.

2. The BT company 30 arranges (610, 620) for a tag (readable by a selected media property 40, 50, or both) to be placed, where the media property is selected based on the expected profit from the delivery of an ad (720) based on the collected profile within the ad space of the media property.

Although the above method focuses on profit calculation that takes into account expected revenues from delivery of an ad based on a collected profile, media property ad space cost and other costs, other parameters beyond costs and revenues might be taken into account. For example, an advertiser might insist that its ads appear on media properties that have certain content and not on other media properties, a media property might not agree to show ads from a certain category (for example, a sports media property might not agree to show sports-related ads, to avoid promoting competitors), etc.

PUBLIC NOTICE REGARDING THE SCOPE OF THE INVENTION AND CLAIMS

The inventor considers various elements of the aspects and methods recited in the claims filed with the application as advantageous, perhaps even critical to certain implementations of the invention. However, the inventor regards no particular element as being "essential," except as set forth expressly in any particular claim.

Although the invention has been described in terms of preferred embodiments and generally associated methods, the inventor contemplates that alterations and permutations of the preferred embodiments and methods will become apparent to those skilled in the art upon a reading of the specification and a study of the drawings.

I claim:

1. A method of directing electronic advertisements, the method comprising:

for each of a multitude of different electronic visitors to a first media property, responsive to receiving information about at least one of a plurality of profile attributes possibly applicable to the visitor, automatically electronically authorizing a third-party second media property to allow display, to the electronic visitor when the visitor visits the second media property at a time after the visitor visits the first media property, of an advertisement correlated with the profile-attribute information received about the visitor, subject to a visitor-specific condition for display of the advertisement that a price charged by the second media property is less than a profile-attribute-dependent price that an advertiser is willing to pay for display of the advertisement.

2. The method of claim 1:
(i) further comprising building a look-up data structure associating at least one selected of a plurality of possible profile attributes with at least one selected of a plurality of second media properties; and
(ii) wherein the method comprises, responsive to receiving an electronic redirect of a visitor computer accompanied by profile-attribute information about the visitor, authorizing said at least one selected second media property on the lookup data structure associated with the profile-attribute information received about the visitor, only during a specified time period after receiving profile-attribute information about the visitor, by arranging for placement of a tag readable by said at least one selected second media property.

3. The method of claim 1 further comprising building a look-up data structure associating at least one selected of a plurality of possible profile attributes with at least one selected of a plurality of second media properties, and wherein the method comprises authorizing those selected second media properties on the lookup data structure associated with the profile-attribute information received about the visitor.

4. The method of claim 1 wherein authorizing responsive to receiving information comprises authorizing responsive to receiving an electronic redirect of a visitor computer accompanied by profile-attribute information about the visitor.

5. The method of claim 1 wherein authorizing responsive to receiving information comprises recognizing an action conducted on the first media property by the visitor.

6. The method of claim 1 wherein authorizing responsive to receiving profile-attribute information comprises authorizing responsive to receiving a search request by the visitor to the first media property.

7. The method of claim 1 wherein authorizing responsive to receiving profile-attribute information comprises authorizing responsive to receiving information about a characteristic of the visitor.

8. The method of claim 1 wherein authorizing responsive to receiving profile-attribute information comprises authorizing responsive to receiving information about a profile attribute of the visitor and categorizing the profile attribute within at least one of a plurality of predefined categories.

9. The method of claim 1 wherein authorizing comprises placing a tag on the electronic visitor, wherein the electronic visitor is a computer, and wherein the tag is readable by the second media property.

10. The method of claim 1 wherein: (i) the method comprises, responsive to receiving an electronic redirect of a visitor computer accompanied by profile-attribute information about the visitor, authorizing display of the advertisement by arranging for placement of a tag readable by the second media property, and (ii) authorizing comprises authorizing display of the advertisement only during a specified time period after receiving profile-attribute information about the visitor.

11. The method of claim 1 wherein the second media property comprises media-property equipment controlling ad space that is in a different medium than the medium of the first media property.

12. The method of claim 1 wherein the second media property comprises equipment controlling ad space only temporarily.

13. The method of claim 1 wherein authorizing responsive to receiving profile-attribute information comprises arranging for placement of a tag associated with the electronic visitor by the third party second media property.

14. The method of claim 13 wherein the condition is a specified time period after receiving profile-attribute information about the visitor.

15. The method of claim 13 wherein the condition is given to the second media property at the time arranging for placement of a tag takes place.

16. The method of claim 15 wherein the condition is given by incorporating it in a URL used to redirect the electronic visitor to the second media property to enable the second media property to place a tag associated with the visitor's computer.

17. The method of claim 13 wherein arranging for placement of a tag comprises redirecting the electronic visitor to the second media property for the second media property to place a tag on the electronic visitor readable by the second media property.

18. A tangible computer-server device programmed to implement a method of directing electronic advertisements, the method comprising:
for each of a multitude of different electronic visitors to a first media property, responsive to receiving information about at least one of a plurality of profile attributes possibly applicable to the visitor, automatically electronically authorizing a third-party second media property to allow display, to the electronic visitor when the visitor visits the second media property at a time after the visitor visits the first media property, of an advertisement correlated with the profile-attribute information received about the visitor, subject to a visitor-specific condition for display of the advertisement that a price charged by the second media property is less than a profile-attribute-dependent price that an advertiser is willing to pay for display of the advertisement.

19. The computer-server device of claim 18 wherein the server is programmed to implement a method further comprising building a look-up data structure associating at least one selected of a plurality of possible profile attributes with at least one selected of a plurality of second media properties, and wherein the method comprises authorizing those selected second media properties on the lookup data structure associated with the profile-attribute information received about the visitor.

20. The computer-server device of claim 18 wherein the server is programmed to implement a method:
(i) further comprising building a look-up data structure associating at least one selected of a plurality of possible profile attributes with at least one selected of a plurality of second media properties; and
(ii) wherein the method comprises, responsive to receiving an electronic redirect of a visitor computer accompanied by profile-attribute information about the visitor, authorizing said at least one selected second media property on the lookup data structure associated with the profile-attribute information received about the visitor, only during a specified time period after receiving profile-attribute information about the visitor, by arranging for placement of a tag readable by said at least one selected second media property.

21. The computer-server device of claim 18 wherein the server is programmed to implement a method wherein authorizing responsive to receiving information comprises authorizing responsive to receiving an electronic redirect of a visitor computer accompanied by profile-attribute information about the visitor.

22. The computer-server device of claim 18 wherein the server is programmed to implement a method wherein authorizing responsive to receiving information comprises recognizing an action conducted on the first media property by the visitor.

23. The computer-server device of claim 18 wherein the server is programmed to implement a method wherein authorizing responsive to receiving profile-attribute information comprises authorizing responsive to receiving a search request by the visitor to the first media property.

24. The computer-server device of claim 18 wherein the server is programmed to implement a method wherein authorizing responsive to receiving profile-attribute information comprises authorizing responsive to receiving information about a characteristic of the visitor.

25. The computer-server device of claim 18 wherein the server is programmed to implement a method wherein authorizing responsive to receiving profile-attribute information comprises authorizing responsive to receiving information about a profile attribute of the visitor and categorizing the profile attribute within at least one of a plurality of predefined categories.

26. The computer-server device of claim 18 wherein the server is programmed to implement a method wherein authorizing comprises placing a tag on the electronic visitor, wherein the electronic visitor is a computer, and wherein the tag is readable by the second media property.

27. The computer-server device of claim 18 wherein the server is programmed to implement a method wherein:
  (i) the method comprises, responsive to receiving an electronic redirect of a visitor computer accompanied by profile-attribute information about the visitor, authorizing display of the advertisement by arranging for placement of a tag readable by the second media property, and
  (ii) authorizing comprises authorizing display of the advertisement only during a specified time period after receiving profile-attribute information about the visitor.

28. The computer-server device of claim 18 wherein the server is programmed to implement a method wherein the second media property comprises media-property equipment controlling ad space that is in a different medium than the medium of the first media property.

29. The computer-server device of claim 18 wherein the server is programmed to implement a method wherein the second media property comprises equipment controlling ad space only temporarily.

30. The computer-server device of claim 18 wherein the server is programmed to implement a method wherein authorizing responsive to receiving profile-attribute information comprises arranging for placement of a tag associated with the electronic visitor by the third party second media property.

31. The computer-server device of claim 30 wherein the server is programmed to implement a method wherein the condition is a specified time period after receiving profile-attribute information about the visitor.

32. The computer-server device of claim 30 wherein the server is programmed to implement a method wherein arranging for placement of a tag comprises redirecting the electronic visitor to the second media property for the second media property to place a tag on the electronic visitor readable by the second media property.

33. The computer-server device of claim 30 wherein the server is programmed to implement a method wherein the condition is given to the second media property at the time arranging for placement of a tag takes place.

34. The computer-server device of claim 33 wherein the server is programmed to implement a method wherein the condition is given by incorporating it in a URL used to redirect the electronic visitor to the second media property to enable the second media property to place a tag associated with the visitor's computer.

35. A system comprising one or more computers programmed to implement a method of directing electronic advertisements, the method comprising:
  for each of a multitude of different electronic visitors to a first media property, responsive to receiving information about at least one of a plurality of profile attributes possibly applicable to the visitor, automatically electronically authorizing a third-party second media property to allow display, to the electronic visitor when the visitor visits the second media property at a time after the visitor visits the first media property, of an advertisement correlated with the profile-attribute information received about the visitor, subject to a visitor-specific condition for display of the advertisement that a price charged by the second media property is less than a profile-attribute-dependent price that an advertiser is willing to pay for display of the advertisement.

36. The system of claim 35 wherein the method further comprises building a look-up data structure associating at least one selected of a plurality of possible profile attributes with at least one selected of a plurality of second media properties, and wherein the method comprises authorizing those selected second media properties on the lookup data structure associated with the profile-attribute information received about the visitor.

37. The system of claim 35 wherein the method:
  (i) further comprises building a look-up data structure associating at least one selected of a plurality of possible profile attributes with at least one selected of a plurality of second media properties; and
  (ii) comprises, responsive to receiving an electronic redirect of a visitor computer accompanied by profile-attribute information about the visitor, authorizing said at least one selected second media property on the lookup data structure associated with the profile-attribute information received about the visitor, only during a specified time period after receiving profile-attribute information about the visitor, by arranging for placement of a tag readable by said at least one selected second media property.

38. The system of claim 35 wherein authorizing responsive to receiving information comprises authorizing responsive to receiving an electronic redirect of a visitor computer accompanied by profile-attribute information about the visitor.

39. The system of claim 35 wherein authorizing responsive to receiving information comprises recognizing an action conducted on the first media property by the visitor.

40. The system of claim 35 wherein authorizing responsive to receiving profile-attribute information comprises authorizing responsive to receiving a search request by the visitor to the first media property.

41. The system of claim 35 wherein authorizing responsive to receiving profile-attribute information comprises authorizing responsive to receiving information about a characteristic of the visitor.

42. The system of claim 35 wherein authorizing responsive to receiving profile-attribute information comprises authorizing responsive to receiving information about a profile attribute of the visitor and categorizing the profile attribute within at least one of a plurality of predefined categories.

43. The system of claim 35 wherein authorizing comprises placing a tag on the electronic visitor, wherein the electronic visitor is a computer, and wherein the tag is readable by the second media property.

44. The system of claim 35 wherein:
(i) the method comprises, responsive to receiving an electronic redirect of a visitor computer accompanied by profile-attribute information about the visitor, authorizing display of the advertisement by arranging for placement of a tag readable by the second media property, and
(ii) authorizing comprises authorizing display of the advertisement only during a specified time period after receiving profile-attribute information about the visitor.

45. The system of claim 35 wherein the second media property comprises media-property equipment controlling ad space that is in a different medium than the medium of the first media property.

46. The system of claim 35 wherein the second media property comprises equipment controlling ad space only temporarily.

47. The system of claim 35 wherein authorizing responsive to receiving profile-attribute information comprises arranging for placement of a tag associated with the electronic visitor by the third party second media property.

48. The system of claim 47 wherein the condition is a specified time period after receiving profile-attribute information about the visitor.

49. The system of claim 47 wherein arranging for placement of a tag comprises redirecting the electronic visitor to the second media property for the second media property to place a tag on the electronic visitor readable by the second media property.

50. The system of claim 47 wherein the condition is given to the second media property at the time arranging for placement of a tag takes place.

51. The system of claim 50 wherein the condition is given by incorporating it in a URL used to redirect the electronic visitor to the second media property to enable the second media property to place a tag associated with the visitor's computer.

* * * * *